Dec. 12, 1939.  R. C. ZEIDLER  2,183,300
APPARATUS FOR HEAT TREATING AND FORMING CLUTCH DISKS OR THE LIKE
Filed July 25, 1938  4 Sheets-Sheet 1

INVENTOR.
Reinhold C. Zeidler
BY Barnes, Kisselle, Laughlin & Raisch
ATTORNEYS

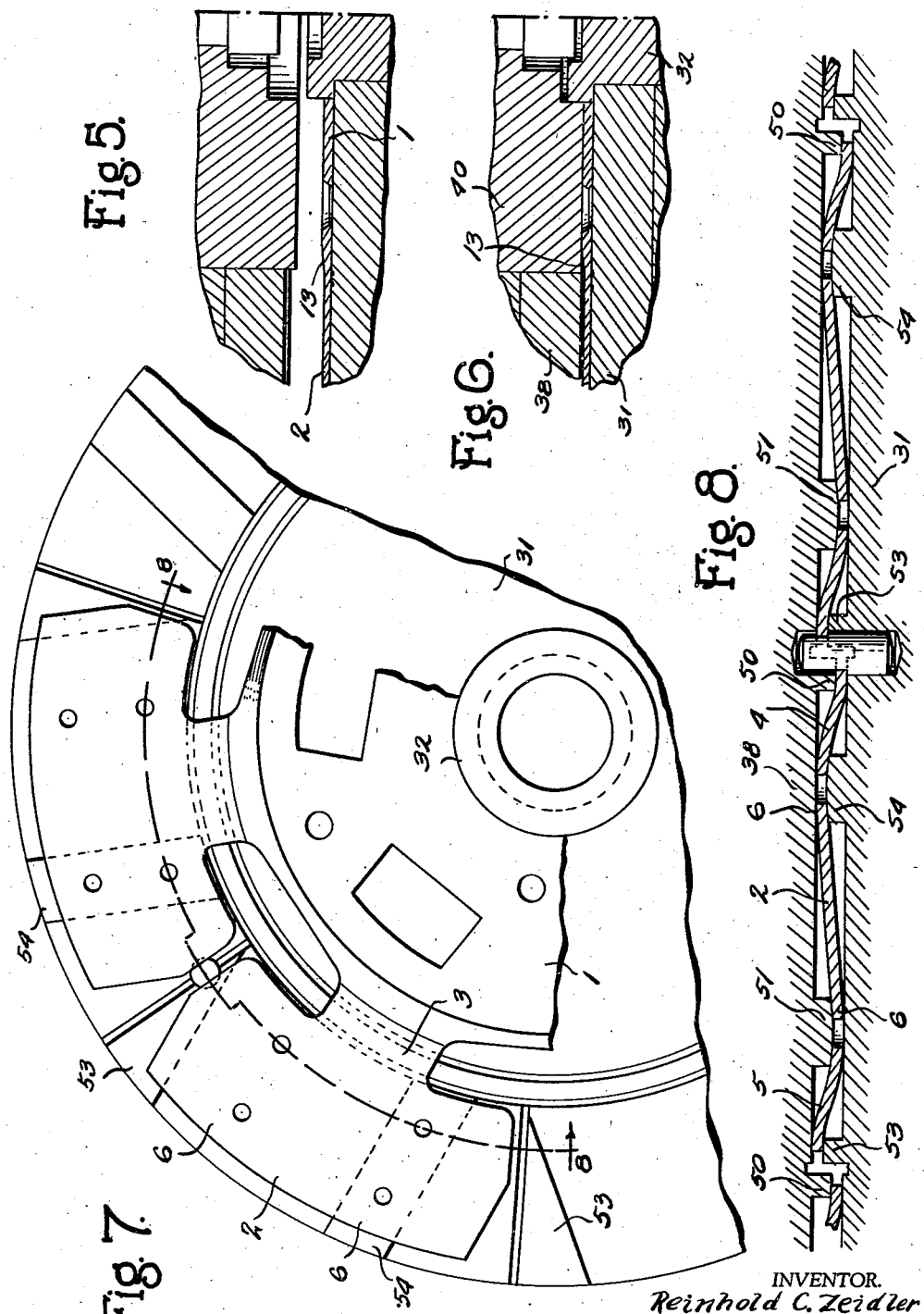

Dec. 12, 1939.   R. C. ZEIDLER   2,183,300
APPARATUS FOR HEAT TREATING AND FORMING CLUTCH DISKS OR THE LIKE
Filed July 25, 1938   4 Sheets-Sheet 4
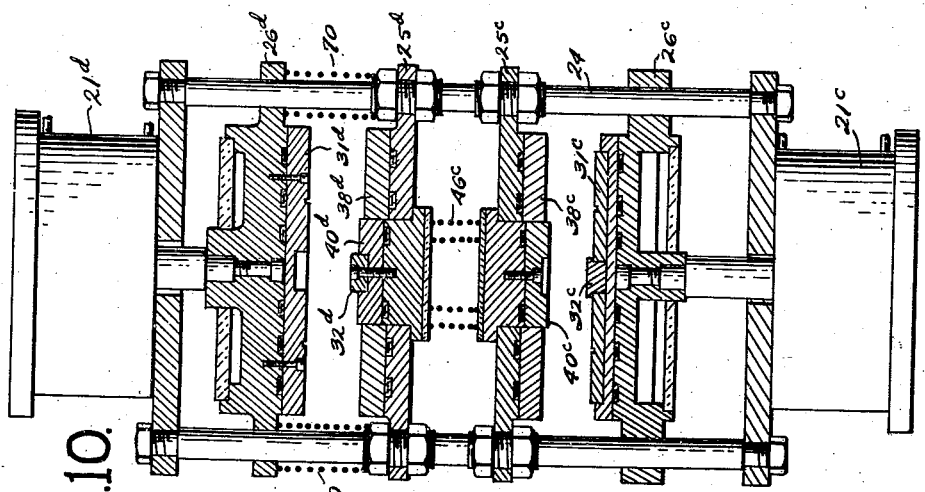
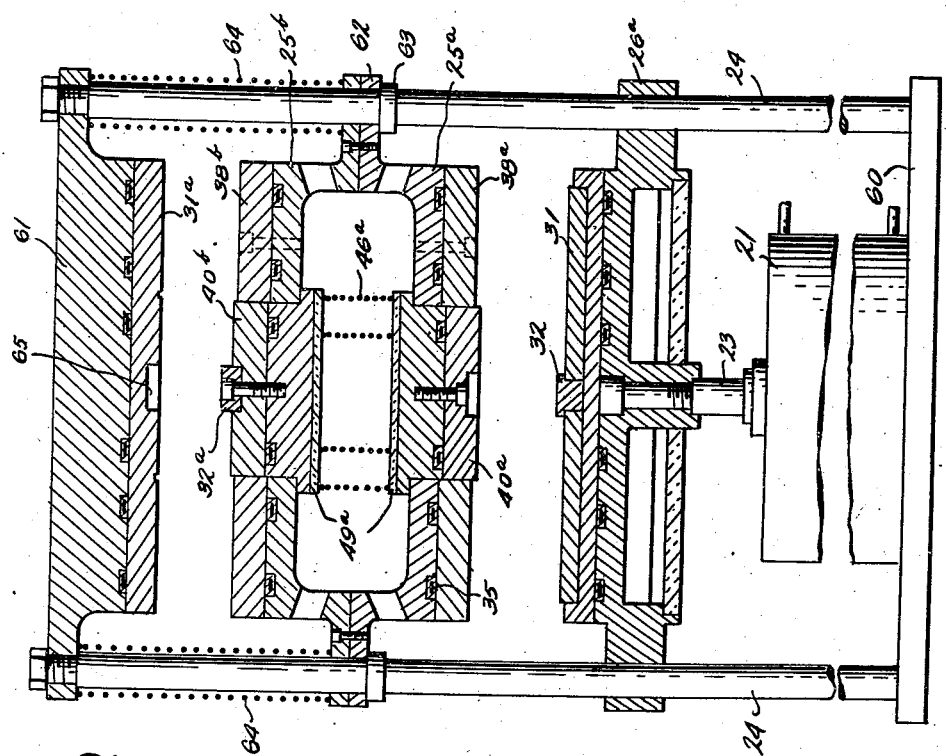
INVENTOR.
Reinhold C. Zeidler
BY Barnes, Kisselle, Laughlin & Raisch
ATTORNEYS Patented Dec. 12, 1939

2,183,300

UNITED STATES PATENT OFFICE 2,183,300

APPARATUS FOR HEAT TREATING AND FORMING CLUTCH DISKS OR THE LIKE

Reinhold C. Zeidler, Detroit, Mich., assignor to Borg-Warner Corporation, Chicago, Ill., a corporation of Illinois Application July 25, 1938, Serial No. 221,157

11 Claims. (Cl. 266—5)

This invention relates to the making of disks or plates of clutch members or the like. Clutch members of the type contemplated are driven members which comprise a disk-like body member arranged to be mounted on a hub and arranged to carry clutch facings in its outer zone. Such a disk is adapted to be packed between clutch driving members, and in order to give a soft clutch action the facings are held yieldably spaced apart. The disk or plate has a formation so as to provide parts which are axially spaced relative to each other for yieldingly supporting facings on opposite sides thereof, so that the facings may be pressed toward each other as the clutch is engaged.

In accordance with the disclosure in the Wemp application, Serial No. 191,145, filed Feb. 18, 1938, the clutch disk has an inner zone of metal stock which is relatively thick to provide adequate strength for attachment to the hub and the like, while the outer zone is relatively thin to provide requisite softness and yieldability for the support of the facings. The present invention is concerned with an apparatus for forming such a clutch disc wherein there is a difference in the thickness of the stock between the inner and outer zones. This difference in thickness may not always be the same; for example, commercial tolerances are permitted in the thickness of the stock from which the disc is made, and if the outer zone is ground to provide a given thickness, the relative thicknesses may vary in accordance with the variation permitted by the commercial tolerances. Accordingly, where such a disk is submitted to heat and pressure, problems are immediately presented in subjecting the entire disk to adequate pressure where there is variation in the stock thickness. Accordingly, the invention aims to provide an apparatus for treating a clutch disk wherein adequate pressure may be applied to all portions of the disk, notwithstanding the differential in the thickness between various zones of the disk and notwithstanding variations in such differential and variations in the thickness of the stock of the different zones. These and other objects of the invention will become better appreciated as the detailed description progresses in conjunction with the accompanying drawings wherein forms of apparatus are shown for carrying out the invention.

Fig. 5 is an enlarged cross sectional view showing the clutch disk in position.

Fig. 6 is a cross sectional view similar to Fig. 5 showing the clutch disk under pressure.

Fig. 7 is a plan view illustrating an arrangement for shaping the clutch disk.

Fig. 8 is a developed cross sectional view taken substantially on line 8—8 of Fig. 7.

Fig. 9 is a general view largely in cross section illustrating a modified form of the invention.

Fig. 10 is another view similar to Fig. 9 illustrating a further modified form.

Figure 1:
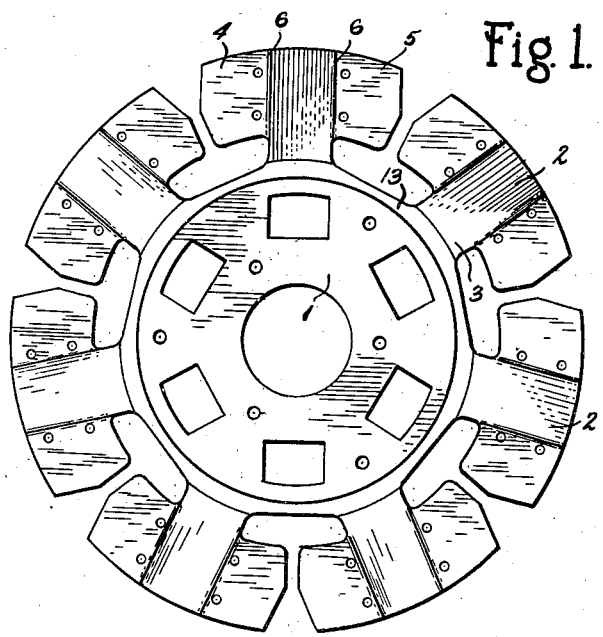
Fig. 1 is a plan view of a clutch disk of the type which may be treated by the present invention.
Figure 2:
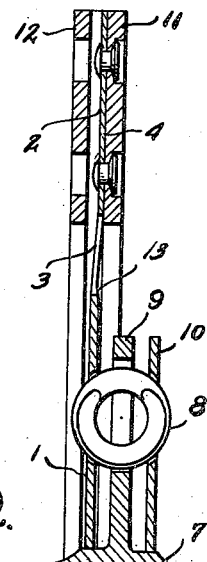
Fig. 2 is an enlarged cross sectional view taken through a clutch driven member embodying the clutch disk.

In order to understand just what the present invention aims to accomplish, it is first necessary to discuss the clutch disk member which is to be handled. Such a disk member is shown in Fig. 1 and it has an inner zone 1 and an outer zone comprised of T-shaped spokes 2. The central portion and neck parts 3 of the spokes are twisted so that opposite wings 4 and 5 of the spokes are in different planes and are spaced axially from each other, the spokes being connected to the central parts substantially on bend lines 6. The central portion of the disk, as shown in Fig. 2, is to be attached to a hub 7, and this arrangement may embody an annulus of coil springs 8 situated in aligned openings in the disk, the hub flange 9 and a washer 10. This arrangement may correspond to that structure disclosed in the Wemp Patent No. 2,042,570 of June 2, 1936, and need not be further described in detail.

The spokes carry facings 11 and 12 which may be in the form of continuous rings, one of which is attached to the several wings 4 by rivets, as shown, taken through the apertures shown in Fig. 1, and the other of which is similarly attached to the wings 5. Thus the facings are yieldingly held in axially spaced relationship, and when the facings are packed between driving members the facings move toward each other, due to their yielding support by the twisting of the central portions and necks of the spokes and then by the flattening out of the heads of the spokes at the bend lines 6.

In order to provide a single disk member which will have adequate strength in its central portion and requisite flexibility in its outer zone there is a difference in the thickness of the stock of the disk. For instance, the inner zone 1 is relatively thick to provide adequate strength, and the outer zone is relatively thin to provide requisite yieldability. One way of forming such a disk is by selecting stock having an initial thickness for the inner zone and then grinding the disk in its outer zone to the required thickness. The zone joining the inner and outer zones may present a beveled formation, as illustrated at 13, which may be the result of the shape of the grinding of the wheels.

Now it will be appreciated that in so forming a disk, the difference in the thickness may not always be uniform; as a matter of fact, in commercial production there is usually some difference. Commercial tolerances are obviously permitted in the thickness of the original stock and if the outer zone is ground to a definite thickness, the differential between the thickness of the inner and outer zones vary within the range of the commercial tolerances. For example, suppose stock of fifty thousandths of an inch in thickness is specified for the disk and the commercial tolerances are plus or minus five thousandths; secondly, suppose it is desired to grind the disk until the outer zone is thirty-five thousandths of an inch in thickness; now if the outer zone is accurately ground to thirty-five thousandths, the difference in thickness between the two zones may vary from ten thousandths to twenty thousandths. Then, of course, there may be variations in the accuracy of the thickness of the stock of the outer zone. This situation presents a problem designed to be overcome by the present invention.

One way to prepare a clutch disk is as follows: First, the disk is blanked out from sheet metal stock and then is ground while in a soft condition to form the relatively thin outer zone. Secondly, the disk is heat treated say to about 1500° and then quenched in oil. This hardens and embrittles the metal stock. At this point the disk may be subjected to a preliminary tempering to take out the extreme brittleness, but this step is optional and it may be necessary at times and unnecessary at other times. The next step is to subject the disk to a tempering operation which reduces the brittleness and also sets the shape of the disk by forming the spokes into their twisted shape and establishing the bend lines 6. This is done by subjecting the disk simultaneously to heat and pressure and it is this last step to which this invention applies. It will be understood that this invention may be applied to disks formed other than the one selected herein for disclosure.

Figure 4:
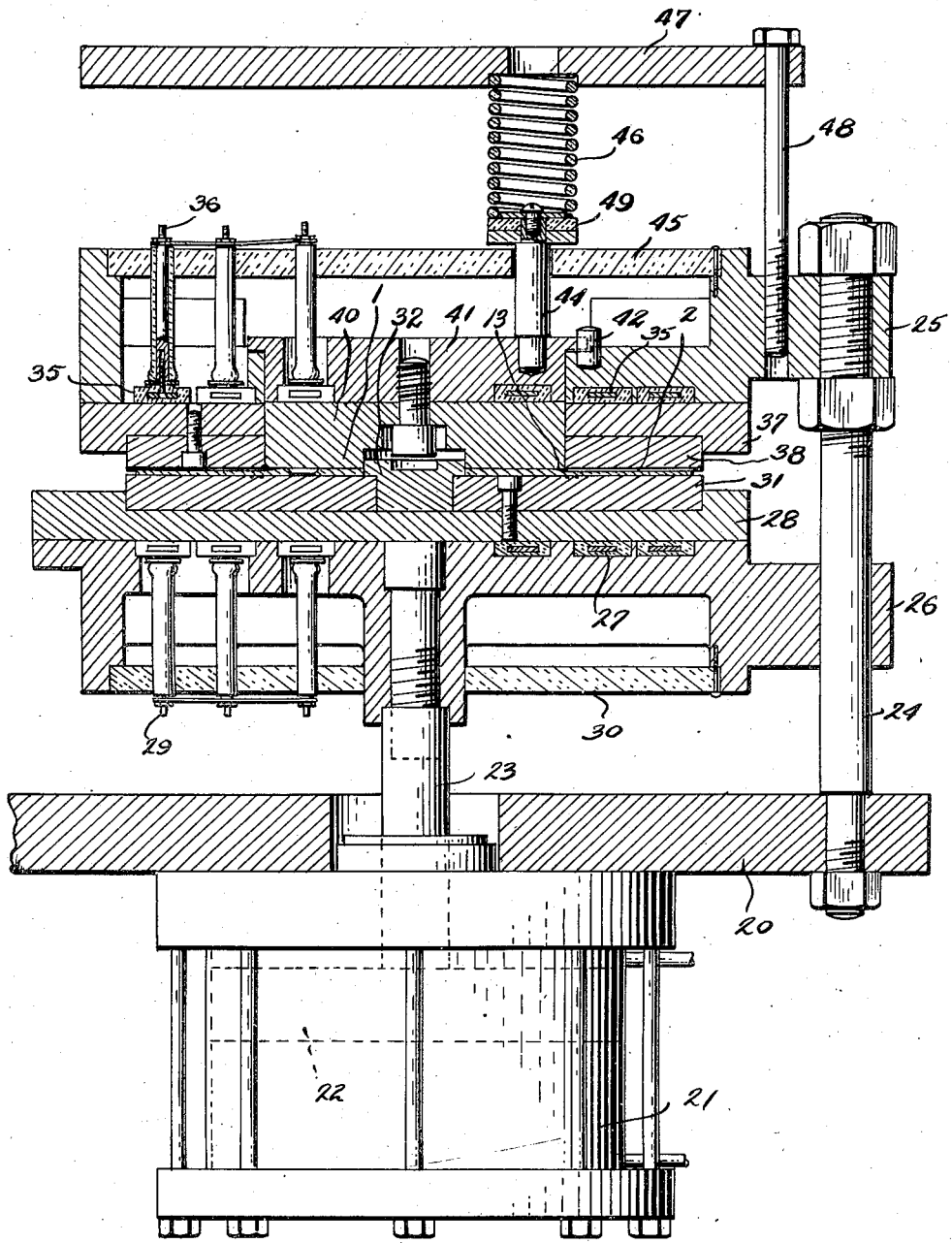
Fig. 4 is an enlarged cross sectional view taken through the apparatus substantially on line 4—4 of Fig. 3.

In Fig. 4 an apparatus is shown comprising a base 20 attached to which is a cylinder 21 with a piston 22 therein having a piston rod 23. Rods 24 are secured to the base and extend upwardly where a head member 25 is secured. A movable head member 26 slidably mounted upon the rods 24, is connected to the piston rod, and associated with this head member are electrical heating elements 27 which are covered by a plate 28 and which have electrical terminals 29 for connection to a power line. A sheet of insulating material 30 may be employed to prevent loss of heat. A die or arbor member 31 is secured to the covering plate 28 by cap screws as shown, and it has a centering member 32. The clutch disk in its ground form is designed to be placed upon the die member 31, and the centering member 32 fits into the central aperture of the disk and centers the same.

The upper head member 25 is equipped with electrical heating elements 35 with terminals 36, and some of these are covered by a plate 37. To this plate is secured an upper die or arbor member 38 by bolts shown.

Figure 3:
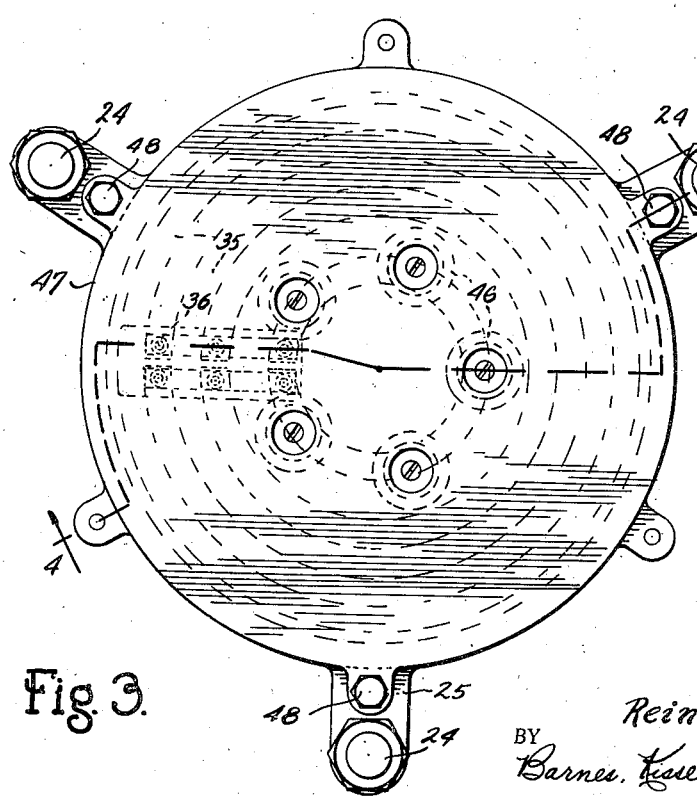
Fig. 3 is a top plan view of the apparatus involving the invention.

The die or arbor 38, however, is arranged to apply pressure to the outer zone of the disk. A second upper pressure or die member 40 is disposed slidingly within the die member 38 and is secured to a guide block 41 slidable in the head 25 and guided by one or more dowel pins 42. Some electrical heating elements may be directly associated with the die member 40. A plurality of studs arranged in an annulus, as illustrated in Fig. 3 and as shown at 44, project upwardly from the guide block 41 and through heat confining insulation 45. These studs are backed up by a coil spring 46, and the coil springs react against a fixed plate 47 secured by bolts 48 to the head 25. The springs 46 are preferably insulated from the heat in addition to the insulation 45 by insulating washers 49.

As shown in Figs. 7 and 8, the arbors or die plates 31 and 38 are fashioned with cooperating projections and recesses to engage the outer zone of the plate and shape the same so as to give it the set desired. As illustrated, the arbor 38 has a series of high points 50 and 51 circumferentially arranged and are staggered with circumferentially arranged high points 53 and 54 of the lower arbor 31, and it will be seen that when the arbors are brought together under pressure that the outer zone of the disk is shaped, thus disposing the central portion of the spokes 2 angularly and fashioning the bends 6. Fig. 8 is somewhat diagrammatic, although it will be seen that the shape of the disk is in excess of the ultimate shape, due to the fact that the metal springs back a certain amount after the disk is released.

With the piston 22 of the cylinder lowered, the lower head 26 and its arbor move downwardly away from the upper head, and then a disk is placed in position as illustrated in Fig. 5. Air pressure is now caused to enter the cylinder to raise the piston and the disk is clamped between the arbors. Heat is applied electrically and the temperature may be in the vicinity of 900° F. Due to the fact that the entire disk is to be tempered it is desired that the entire disk be subjected to pressure and at the same time it is necessary that the outer zone be given a requisite shape by the arbors. Now if the upper arbor were of one piece the outer zone would not be subjected to pressure in the event that the inner zone were a little too thick. All the pressure would be taken on the inner zone. Conversely, if the inner zone were a little too thin, all the pressure would be taken by the outer zone and the inner zone would not be subjected to pressure. For the purpose of the above, let it be assumed that the specifications required an inner zone of fifty thousandths of an inch in thickness and the outer zone of thirty-five thousandths, and that the upper die was machined for these dimensions. Obviously, variations in commercial tolerances would result in the difficulties above noted.

However, with the present arrangement, even though there are variations in the thicknesses, the pressure is applied over the entire area. The upper die member 38 is relatively fixed and therefore the outer zone is clamped with pressure determined by the size of the cylinder and the air pressure employed. The springs 46 are selected to afford the desired pressure on the inner zone, and the inner die member 40 is axially shiftable relative to the outer arbor 38. The normal set-up may be that the inner die member 40 projects slightly below the die member 38 so that there will always be a compression of the springs 46. Only a few thousandths of compression is necessary, and the springs 46 may be very stiff and of such strength as to provide the requisite pressure. The lower arbor 31 may be a single piece as shown and the flat side of the disk is arranged to be placed next adjacent this arbor.

In Fig. 9 a modification is shown for the treating of two disks in a single operation. The details of the structure are the same as those shown in Fig. 4, and in the main, most of the same reference characters are used, some with letter references added. In this form the cylinder 21 is shown as resting upon a base support 60, and the rods 24 rise therefrom. The slidable head 26a may be the same as the head 26 heretofore described. On the top of the posts 24 is a fixed head 61 having an inverted die 31a similar to the die 31. Intermediate the height of the posts is a slidable double head 62 normally resting upon projections 63 and urged downwardly by relatively light coil springs 64. The double head 62 comprises a lower head member 25a generally corresponding to the head 25 and having an outer die member 38a and an inner die member 40a, the electrical elements being the same as those heretofore described and illustrated at 35. The double head 62 comprises an upper head portion 25b with an outer die member 38b and an inner die member 40b. One variation is that the pilot 32 located in the die 31, as shown in Fig. 4, is reversed in the upper portion and is located in a die member 40b as shown at 32a, the die 31a having a recess 65 for accommodating the same.

In this form one disk is disposed on the die 31 with its flat face downwardly and another disk is located on the die 40b—38b with its flat face upwardly. Now, upon the applying of air pressure the head 26a moves upwardly and the lower disk is engaged between the dies 31 and 38a—40a, and then the double arbor is lifted so that the upper disk is engaged between the dies 31a and 49b—40b. The springs corresponding to springs 46 of Fig. 4 and illustrated at 46a are disposed between the dies 40a and 40b and protected by insulation 49a. It will be seen, therefore, that the dies 40a and 40b may shift against spring action to take care of the thickness differentials, and it makes no difference even if there is a variation between the upper and lower disks which are acted upon.

In Fig. 10, two oppositely positioned air cylinders are used; the lower air cylinder 21c is connected to a head 26c, the same as that heretofore described, having a die 31c. The upper cylinder 21d is connected to an inverted head 26d with its inverted die 31d. The upper head may be held upwardly by coil springs 70. Fixed to the rods 24 is an intermediate head 25c and an intermediate head 25d. The head 25d may be substantially the same as the head 25b shown in Fig. 4 having an outer die 38d and an inner die 40d and centering device 32d, and the head 25c may be similar except that it is inverted. The head 26c carries the centering device 32c corresponding to the illustration shown in Fig. 9.

In this form a clutch disk is placed upon the die 31c with its flat face against the die and a clutch disk is placed on the die 38d—40d with its flat side upwardly. Air pressure may now be simultaneously applied to the two cylinders for shifting the head 26c upwardly and the upper head 26d downwardly to clamp the disks between the dies. The dies 40c and 40d are backed up by the springs 46c in the same manner as described in connection with Fig. 9.

I claim:

1. An apparatus for heat treating and shaping a sheet metal body such as a clutch disk having zones of different thicknesses and wherein the differential may vary which comprises, two die members arranged to receive the metal body therebetween and to apply heat and pressure to the metal body, one of said die members comprising relatively movable die parts for engaging zones of different thicknesses and one of said parts being backed solely by yielding means.

2. An apparatus for heat treating and shaping a sheet metal body such as a clutch disk having zones of different thicknesses and wherein the differential may vary and being flat on one side and having surfaces in different planes on the opposite side which comprises, two die members arranged to receive the metal body therebetween and to engage the metal body with pressure and to apply heat thereto, one of said die members comprising relatively immovable parts adapted to engage the flat side of the body and the other of said die members comprises relatively movable parts for engaging surfaces thereof in different planes and yielding means for backing one of said relatively moving parts and operable as the only backing means when the part is applied to the clutch disk with pressure.

3. An apparatus for heat treating and shaping a metal clutch disk or the like having zones of different thicknesses wherein the differential may vary comprising two die members arranged to receive the clutch disk therebetween, one of said die members being of rigid formation and having a contour substantially corresponding to one side of the clutch disk, the other of said die members comprising relatively movable parts for engaging the surfaces at zones of different thicknesses, yielding means constituting the sole backing means for one of said parts whereby the second mentioned die member adapts itself to the surfaces of the disk with which it engages, means for bringing the die members together with pressure with the disk disposed therebetween, and means for applying heat to the die members.

4. An apparatus for heat treating and shaping a metal clutch disk having zones of different thicknesses and wherein the differential may vary and having one side substantially flat in form and the other side comprising surfaces in different planes at the different zones comprising, two die members, one of said die members being of rigid formation and arranged to engage the flat side of the disk, the other of said die members comprising relatively movable parts for engaging surfaces on the opposite side of the disk which lie in different planes, yielding means constituting the sole backing means for one of said parts whereby the second mentioned die may adapt itself to the contour of the disk, means for bringing the die members toward each other with pressure to engage the disk on opposite sides, and means for applying heat to the die members.

5. An apparatus for heat treating and shaping a metal clutch disk or the like having an inner zone of relatively thick stock and an outer zone of relatively thin stock and wherein the difference in thickness is subject to variation, comprising, a rigid die member for engaging one side of the disk, a second die member for engaging the opposite side of the disk, said second die member having an outer part for engaging the outer zone of the disk, said outer part and the outer portion of the first named die having cooperating high and low spots for deforming the outer zone of the disk, said second die member having an inner part which is movable relative to its outer part in a direction substantially perpendicular to the die face for engaging the relatively thick inner zone of the disk, whereby the second die may adapt itself to the contour of the side of the disk with which it engages, and means for bringing the dies toward each other to engage the disk with pressure and for applying heat thereto.

6. An apparatus for heat treating and forming a metal clutch disk or the like of sheet metal having an inner zone of relatively thick stock and an outer zone of relatively thin stock and having one side substantially flat and its other side substantially in two planes, and wherein the difference in thickness is subject to variation, a rigid die member for engaging the flat side of the disk, a second die member for engaging the opposite side of the disk, said second die member having an outer part for engaging the outer zone of the disk, said outer part and the outer portion of the first mentioned die having cooperating high and low spots for deforming and shaping the outer zone of the disk, said second die having an inner portion for engaging the thick inner zone of the disk, said inner part being shiftable relative to the outer part in a direction substantially perpendicular to the face of the die member, yielding means acting upon the inner die part, and means for bringing the die members toward each other to apply pressure to the disk, said inner part of the second die member shifting against the said yielding means so that the second die member adapts itself to the contour of the face of the disk with which it engages.

7. An apparatus for heat treating and shaping a metal clutch disk or the like having a thick inner zone and a thin outer zone and being flat on one side and having surfaces at the zones which are in different planes on its opposite side comprising, a rigid die member for engaging the flat side of the disk, a second die member for engaging the opposite side of the disk, said second die member comprising, a relatively fixed outer die part for engaging the outer part of the disk, said outer die part and the outer portion of the first mentioned die having cooperating high and low spots for shaping the outer zone of the disk, said second die member having an inner die part slidably mounted, spring means for backing up the slidably mounted inner part, means for heating the dies, means for bringing the die members toward each other to apply pressure and heat to the disk for heat treating the same and shaping the outer zone, and means for insulating the springs from the heat of the die members.

8. An apparatus for heat treating and shaping a metal clutch disk or the like having a thick inner zone and a thin outer zone and being flat on one side and having surfaces at the zones which are in different planes on its opposite side comprising, a rigid die member for engaging the flat side of the disk, a second die member for engaging the opposite side of the disk, said second die member comprising, a relatively fixed outer die part for engaging the outer part of the disk, said outer die part and the outer portion of the first mentioned die having cooperating high and low spots for shaping the outer zone of the disk, said second die member having an inner die part slidably mounted, spring means for backing up the slidably mounted inner part, means for heating the dies, means for bringing the die members toward each other to apply pressure and heat to the disk for heat treating the same and shaping the outer zone, means for generally insulating the springs from the heat of the die members, and means for locally insulating each spring from the heat of the die members.

9. An apparatus for heat treating and forming a plurality of sheet metal clutch disks or the like having a thick inner zone and a thin outer zone comprising, a reciprocably mounted lower die member of rigid form, a fixed upper die member of rigid form, a pair of reversely positioned intermediate die members reciprocably mounted and each having an outer part and an inner part movable relative to the outer part, yielding means for backing up said inner parts, said die members arranged to receive a clutch disk between the lower and upper dies and the intermediate dies, and means for shifting the lower die upwardly to engage the clutch disks between the dies and to elevate the intermediate dies against the upper fixed die, the said inner parts shifting against the yieldable means to adapt their position relative to the surfaces of the disks, and means for heating the dies.

10. An apparatus for heat treating and forming a plurality of sheet metal clutch disks or the like each having a thick inner zone and a thin outer zone comprising, a reciprocably mounted lower die of rigid form, a reciprocably mounted upper die of rigid form, two oppositely positioned intermediate dies for cooperation with the lower and upper dies and disposed in a fixed position, each intermediate die having a relatively fixed outer die part for engaging the outer zone of a disk, each intermediate die having an inner part slidable relative to its outer part, yieldable means disposed between the two inner die parts, the lower die and one intermediate die adapted to receive a disk therebetween, the upper die and the other intermediate die adapted to receive a disk therebetween, means for shifting the lower and upper dies to engage the clutch disks between the dies, said inner die parts of the intermediate dies shifting to adapt themselves to the contour of the disks, and means for heating the dies.

11. An apparatus for heat treating and shaping a metal clutch disk or the like having a relatively thick zone and a relatively thin zone, a rigid die member for engaging one side of the disk, a second die member for engaging the opposite side of the disk, said second die member comprising, a relatively fixed die part for engaging one zone of the disk and a relatively movable die part for engaging another zone of the disk, spring means for backing said relatively moving die part, the first mentioned die and the fixed part of the second die being formed to shape the zone of the disk therebetween, means for heating the dies, means for bringing the die members toward each other to apply pressure and heat to the disk for heat treating and shaping the same, and means for insulating the spring means from the heat of the die members.

REINHOLD C. ZEIDLER.